United States Patent [19]

Tudisco

[11] 3,991,502
[45] Nov. 16, 1976

[54] FLYING GAFF
[76] Inventor: Vincent J. Tudisco, 19 Linwood Ave., Emerson, N.J. 07636
[22] Filed: Dec. 3, 1975
[21] Appl. No.: 637,280

Related U.S. Application Data
[63] Continuation-in-part of Ser. No. 571,614, April 25, 1975, abandoned.

[52] U.S. Cl. .................................................. 43/5
[51] Int. Cl.² ...................................... A01K 97/14
[58] Field of Search .............. 43/5, 6, 44.83, 44.86, 43/43.16; 294/26

[56] References Cited
UNITED STATES PATENTS

| 1,401,086 | 12/1921 | King | 43/44.83 |
|---|---|---|---|
| 1,404,117 | 1/1922 | Hanson | 294/26 |
| 2,677,911 | 5/1954 | Fink | 43/5 |
| 2,775,842 | 1/1957 | McCode | 43/44.86 |
| 2,789,388 | 4/1957 | Frietas | 43/43.16 |

Primary Examiner—Warner H. Camp
Attorney, Agent, or Firm—Jack Matalon

[57] ABSTRACT

A flying gaff, useful in gaffing large fish such as sharks, comprising a hook containing an elongated shaft and a wing member mounted on said shaft such that the wing member is capable of rotational movement around the shaft with little axial movement, said wing member having an aperture at its lower extremity through which a rope may be readily attached and detached. The gaff also includes a handle to detachably receive the lower extremity of the shaft such that the shaft may be readily urged into and detached from the handle.

10 Claims, 9 Drawing Figures

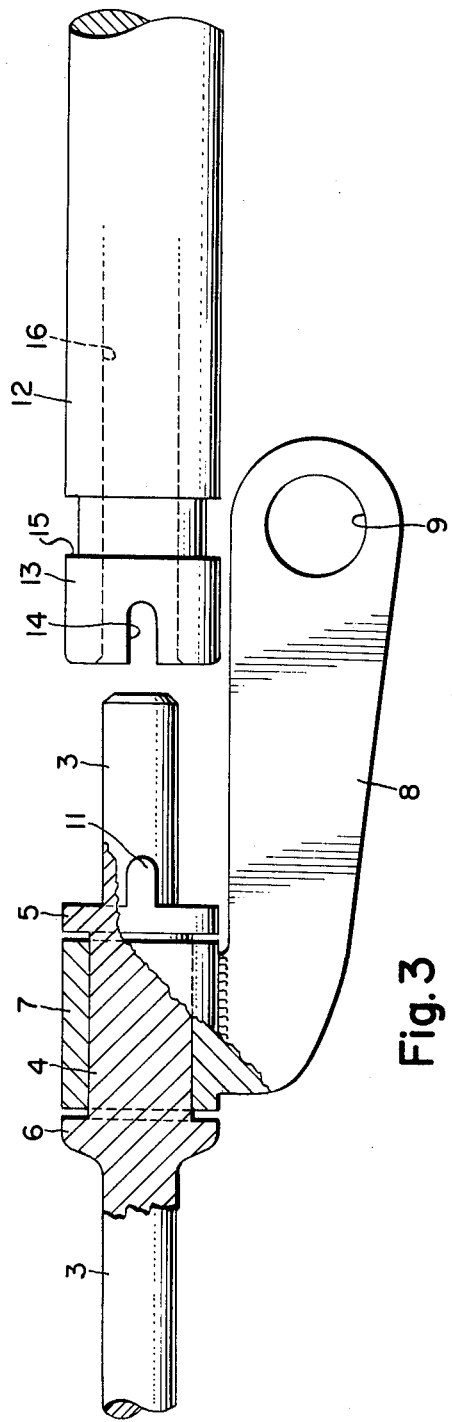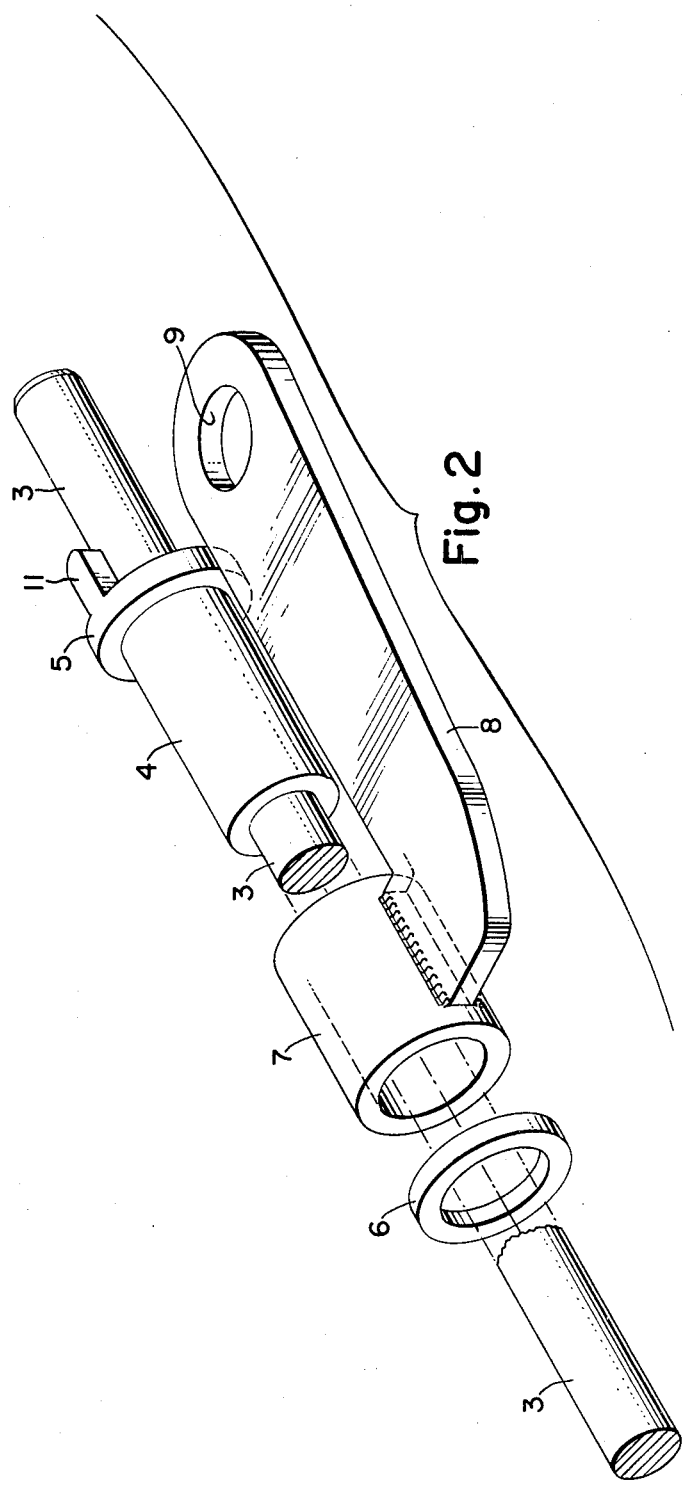

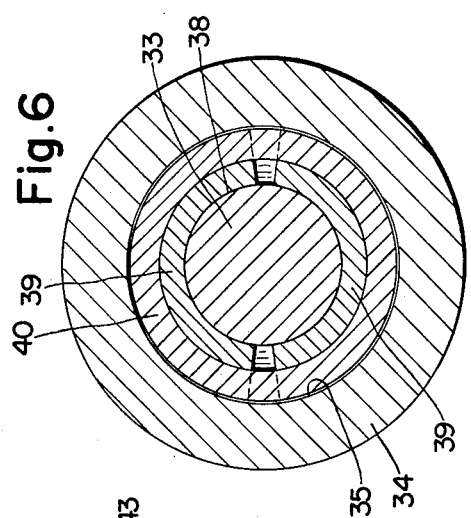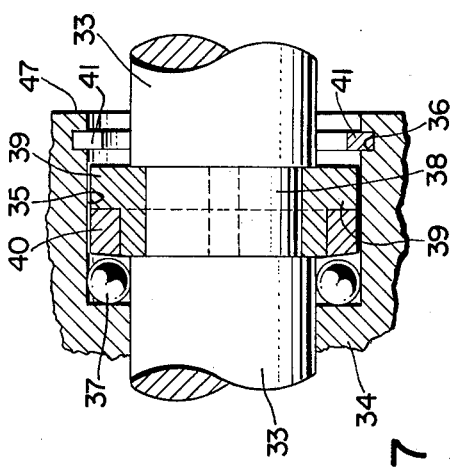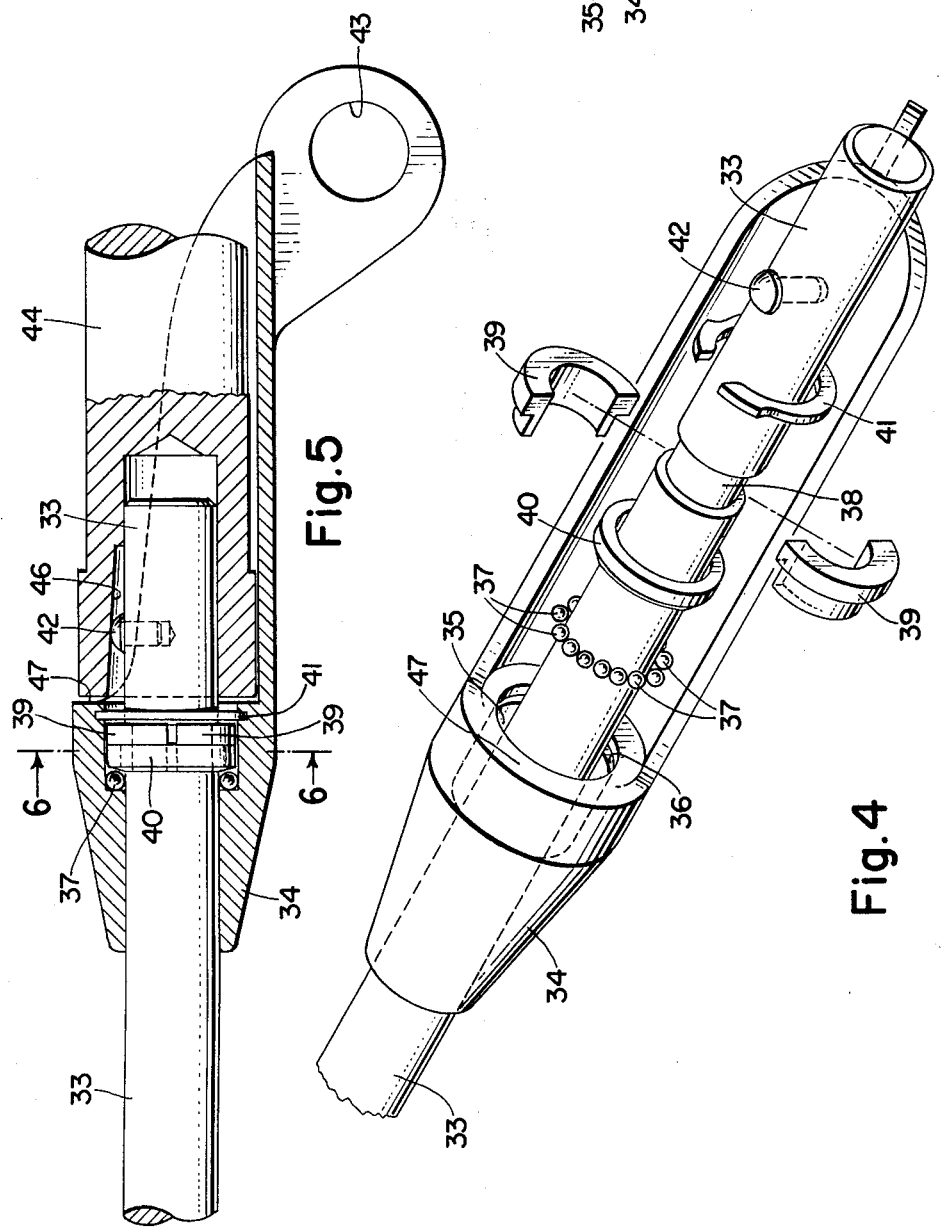

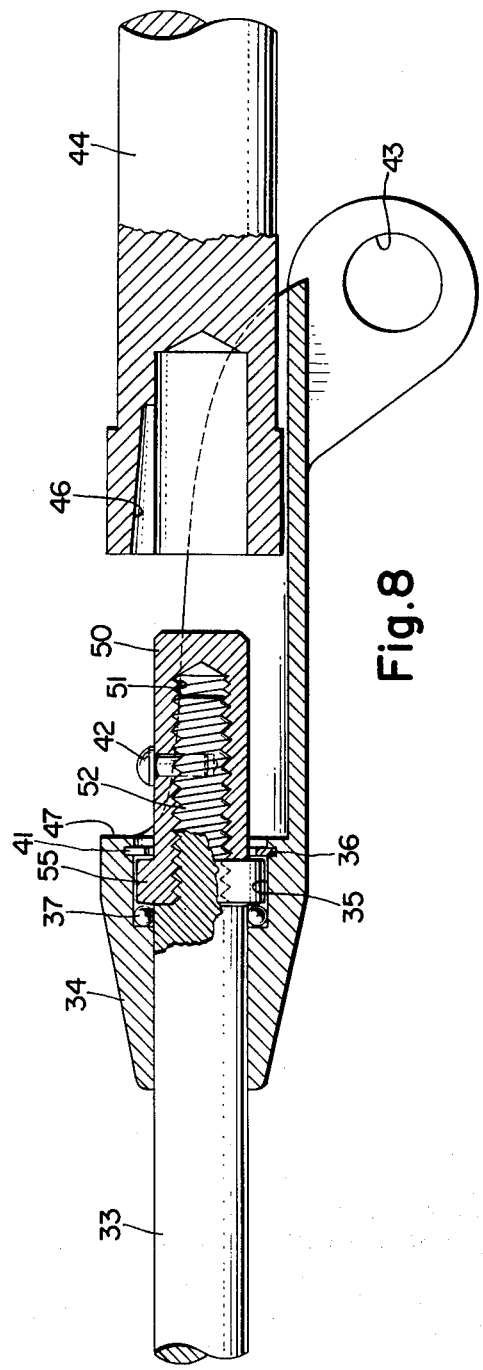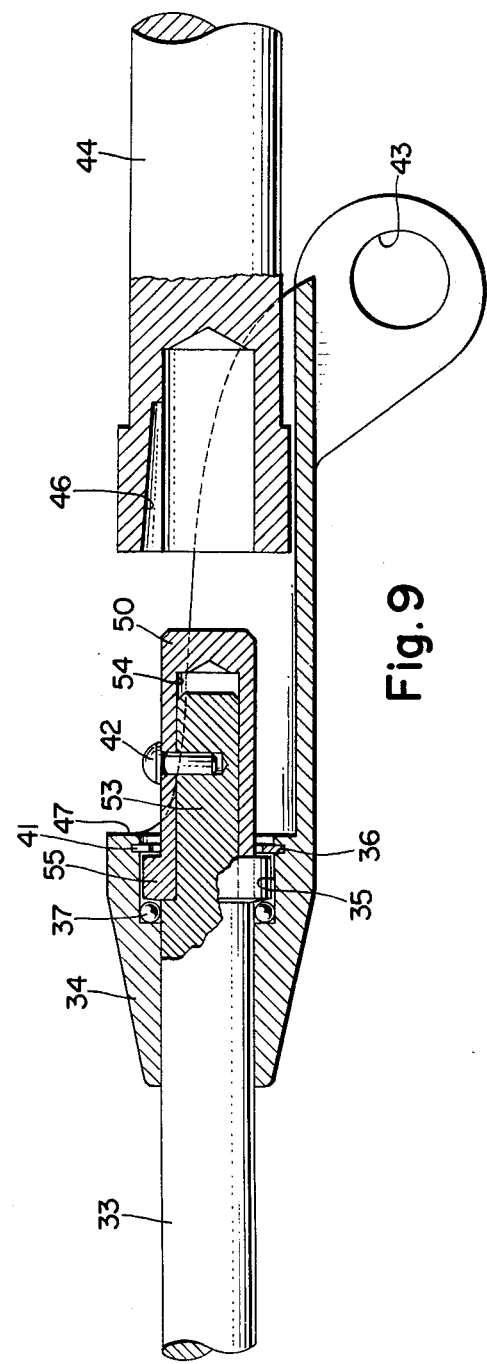

FLYING GAFF

REFERENCE TO RELATED APPLICATION

This application is a continuation-in-part of my earlier copending application Ser. No. 571,614 filed Apr. 25, 1975 entitled "FLYING GAFF" and now abandoned.

BACKGROUND OF THE INVENTION

This invention is concerned with a flying gaff for gaffing large fish, such as sharks. Flying gaffs presently commercially available suffer from several disadvantages: the line-mounting member is attached to the shaft and the aperture is at its upper extremity for attaching the line thereto and further the member is rigidly mounted onto the shaft. When a handle is attached to the lower extremity of the shaft, the gaff is ready for insertion into the body of the shark. After insertion of the gaff into the shark's body, the handle is detached from the shaft and the rope or chain affixed to the top of the member is relied upon to maintain contact between the fishing boat and the shark's body. However, the shark will readily roll and thrash about after being gaffed and the strain on the hook is such that it is invariably readily dislodged from the shark's body due to such rolling and turning action or due to strain which results in bending or distorting of the hook thereby resulting in a failure to maintain the proper angle of contact of the hook relative to the shark's body.

In the present invention, the aperture of the wing member is located at its lower extremity (that is, the greatest distance from the hook point) and furthermore, the wing member is mounted on the shaft such that it is freely rotatable around the shaft. This causes the strain (after the fish is gaffed) to be centered in the area of greatest structural strength of the hook, i.e. in the area of the semicircular curvature between the barb or hook point and shaft and also permits the proper angle or contact of the hook in the fish's body despite its rolling and thrashing actions. As the distance between the aperture (for affixing the retrieving line) of the wing member and the hook point or barb increases, the gaffing action becomes more efficient (thus the wing member should be as long as is conveniently possible).

DETAILS OF THE PRESENT INVENTION

This invention comprises a (gaffing) hook having an elongated shaft and a handle to detachably engage the lower portion of the shaft (e.g. by means of a groove or channel in a portion of the handle which detachably mates with a corresponding rib on the shaft). Typically the handle is a tube whose length may be increased by adding additional sections of tubing (e.g. by mating screw threads in the sections).

The critical aspect of this invention lies in the wing member which is affixed on the shaft (preferably at the mid- or lower portion of the shaft). The wing member must be affixed to the shaft in a manner such that it is freely rotatable around the shaft, but nevertheless has its axial movement (i.e. movement up and down the shaft parallel to the longitudinal axis of the shaft) restricted. The wing member may be affixed to the shaft in a variety of ways. For example, a channel may be cut circumferentially around the shaft with the width of the channel equal to the height of the wing member at the point of attachment of the wing member to the shaft. The wing member may then be pressed into the channel. Another method is to wire the wing member around the shaft between two beads (molded, welded, soldered, etc.) running continuously circumferential around the shaft. The preferred method is to affix the wing member permanently (e.g. by welding) to a sleeve which in turn is freely rotatable around the shaft. The most preferred method is that shown in the drawings described below.

The wing member should have a hole or aperture for detachably receiving a rope (other types of "lines" such as chains may be used) which is affixed to the wing member (e.g. by knotting or having a ring at its end which is clipped onto an end of a hook the other end of which is affixed to the hole or aperture).

This invention may be better understood with reference to the drawings in which:

FIG. 2 is an exploded perspective view showing in detail the portion of the gaffing hook in the area where the wing member is attached thereto.

FIG. 3 is a top plan view showing the same portion of the gaffing hook and wing member as in FIG. 2 and also showing the shaft about to be mounted in the handle.

FIG. 4 is an exploded perspective view showing in detail the portion of a preferred form of the gaffing hook in the area where the wing member is attached thereto.

FIG. 5 is a vertical cross-sectional view of the same portion of the gaffing hook as shown in FIG. 4.

FIG. 6 is a vertical cross-sectional view taken along the lines 6—6 of FIG. 5.

FIG. 7 is an enlarged view of a portion of FIG. 5.

FIG. 8 is a vertical cross-sectional view of a first modified form of that gaffing hook shown in FIG. 4.

FIG. 9 is a vertical cross-sectional view of a second modified form of that gaffing hook shown in FIG. 5.

In each figure, like numerals refer to the same features. Referring now in detail to the drawings:

Figure 1:
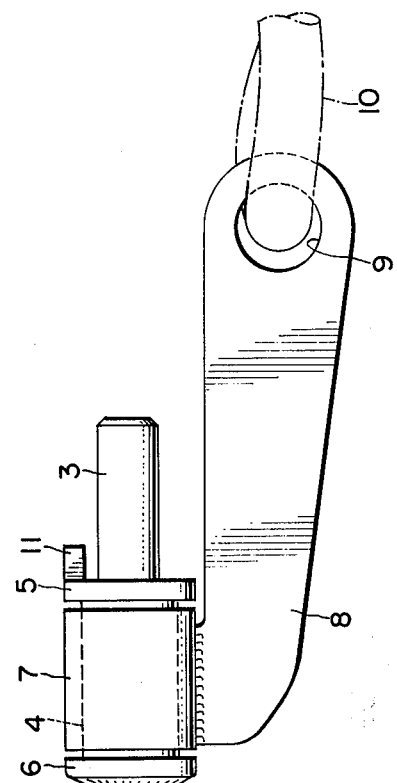
FIG. 1 is an elevation view of the gaffing hook containing the wing member.
Figure 1:
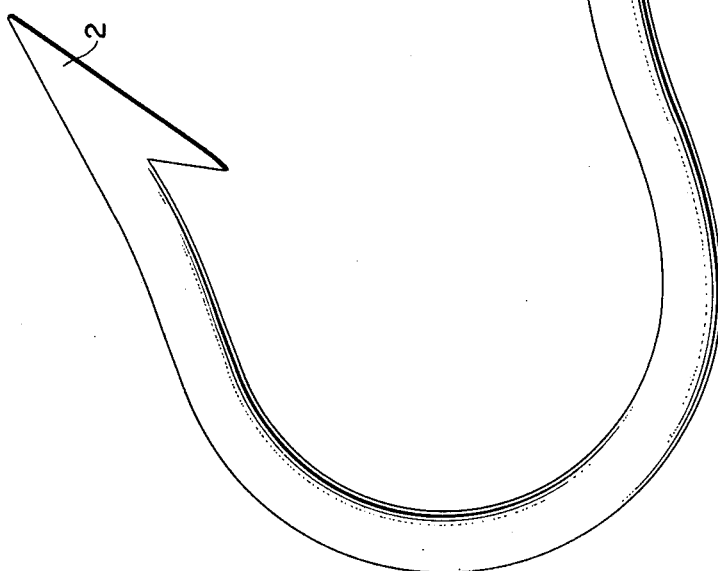

In FIG. 1, the gaffing hook contains a conventional barb (or point) 2 and an elongated shaft 3. Affixed to the lower portion of shaft 3 is a bushing 4 having, as an integral portion thereof, a lower collar 5 containing a tang 11. Instead of a bushing, an inner sleeve may be utilized and the lower collar (e.g. a washer) may be pressed onto the sleeve and affixed to the lower extremity of the sleeve (e.g. by welding).

In any event, the lower extremity of shaft 3 must emerge from and extend below the bushing or sleeve. The length of shaft 3 below collar 5 is not critical (e.g. it may vary from about ½ inch to several inches; it is only necessary that it extend a sufficient amount for stability when it is inserted into the handle as described hereinbelow with reference to FIG. 3).

Bushing 4 is provided with an upper collar 6 which may be pressed onto and affixed (e.g. by welding) to the upper extremity of bushing 4. It is convenient to affix collar 6 to bushing 4 in a manner such that a slight length of bushing 4 extends above collar 6 (e.g. 1/16–¼ inch).

Wing member 8 contains an aperture 9 located at its lower extremity for detachably affixing a retrieving line 10 (or a rope chain, cable, etc.) thereto. Wing member 8 is affixed (e.g. by welding) at its upper extremity to outer sleeve 7 which has a diameter such that it is freely rotatable around bushing 4.

In assembling the component parts of this invention, it is convenient to have the wing member 8 preaffixed to outer sleeve 7. Outer sleeve 7 may then be slipped over bushing 4 containing lower collar 5 prior to affixing upper collar 6 to bushing 4. Thereafter, upper collar 6 is affixed to the upper extremity of bushing 4 such that a slight "lip" of bushing 4 extends above upper collar 6 and also such that free rotatability of sleeve 7 around bushing 4 is not restricted, although axial movement of sleeve 7 relative to bushing 4 is restricted by means of collars 5 and 6. Shaft 3 is then inserted through the entire assembly such that the lower extremity thereof (e.g. 1–2 inches) extends below collar 5. Axial movement as well as rotational movement of bushing 4 relative to shaft 3 is then restricted by affixing (e.g. by welding) shaft 3 to the lip of bushing 4 extending above upper collar 6.

The sizes and dimensions of the various components are not critical and may vary widely depending on factors such as the type and weight of fish to be gaffed. In FIG. 1, the entire unit has the dimensions which may be utilized when gaffing sharks. All of the materials used in the fabrication of the entire assembly are those conventionally used for high strength applications, e.g. mild steel, stainless steel, reinforced plastics, etc.

The detailed description of FIG. 2 is to the same effect as FIG. 1, except that the upper portion of the hook containing barb or point 2 is not shown.

In FIG. 3, there is shown handle 12 which is typically a tubular member (constructed of steel, aluminum, etc.) and having an i.d. of about ⅛ inch or more greater than the o.d. of shaft 3. Handle 12 (which may vary in length from 1 to 50 feet or more) has a shoulder 15 which serves to restrict the length of insertion of cylindrical member 13 into handle 12. The dimensions of cylindrical member 13 relative to handle 12 are preferably such that a snug water-tight fit is obtained and rotational and axial movement are restricted. Cylindrical member 13 must contain an inner bore 16 whose diameter is such that it is slightly greater than the o.d. of shaft 3. A channel 14 is formed into the upper extremity of cylindrical member 13; channel 14 has a dimension of length and width slightly greater than that of tang 11.

In preparing to gaff the fish, shaft 3 is inserted into handle 12 (approximately to the depth shown in broken lines within handle 12) which is turned, if necessary such that tang 11 will mate with channel 14. The combination of gaffing hook (containing a suitable line affixed to wing member 8 by means of aperture 9) and handle and line are used to gaff the fish. Once the fish has been gaffed, the gaffing hook will readily slide out of, and become detached from, handle 12 (which is then laid aside). The line attached to wing member 8 is then utilized to gradually retrieve the gaffed fish.

Referring to FIGS. 4, 5, 6 and 7, outer sleeve 34 contains a well 35 and a wing member affixed (e.g. by welding) to its upper extremity and the wing member contains aperture 43 for detachably affixing a retrieving line thereto. Outer sleeve 34 is slipped over shaft 33 (outer sleeve 34 must be freely rotatable around shaft 33) which contains at its upper extremity a gaffing hook (not shown). Well 35 contains at its base a plurality of ball bearings 37. After outer sleeve 34 has been slipped over shaft 33, ball bearings 37 (preferably greased with a suitable lubricant) are inserted into well 35. Collar ring 40 is then slipped onto shaft 33 and thereafter a plurality of split collar rings 39 are mounted around annular recess 38 contained on shaft 33. Split collar rings 39 have a bossed portion and a recessed portion such that collar ring 40 may be slipped over the recessed portion to thereby tightly hold split collar rings 39 in place on shaft 33. The assembly of collar ring 40 and split collar rings 39 will result, in effect, in an inner shoulder. Outer sleeve 34 containing ball bearings 37 is then urged up against the underside face of collar ring 40 and the assembly completed by insertion of retaining ring 41 into groove 36. A protuberance such as pin 42 having a bossed head is inserted into shaft 33 and pin 42 serves to detachably mate with an internal channel 46 contained within tubular member 44. The construction and details concerning tubular member 44 are the same as those previously described hereinabove in FIG. 3, with the exception that channel 46 is internal (rather than external as was the case of channel 14 described with reference to FIG. 3). The dimensions of channel 46 relative to the head of pin 42 should be such as to insure a tight detachable fit between the two, i.e. preferably contact of tubular member 44 with face 47 should be avoided.

In FIGS. 8 and 9, those parts which have the same numerals as in FIGS. 4–7, correspond identically thereto. The particular differences between FIGS. 8 and 9 versus FIGS. 4–7 reside in the fact that (a) the "inner shoulder" is not formed by split collar rings and a collar ring and (b) the shaft is constructed of two parts.

Referring in detail to FIG. 8, outer sleeve 34 contains a plurality of ball bearings 37 located at the base of well 35. Shaft 33 terminates in a cylindrical member having external threads 52. A second part 50 contains inner shoulder 55 permanently affixed thereto and also contains internal threads 51 which mate with external threads 52. After mating threads 52 with 51, it is desirable to insure against any unthreading by inserting pin 42 (desirably having a bossed head) through part 50 and at least partially into shaft 33 at some point of mating of the threads 52 and 51. Assembly of the ball bearings 37 into well 35 and insertion of retaining ring 41 into groove 36 as well as the detachable engagement of internal channel 46 (of tubular member 44) with the boss of pin 42 is accomplished in the same manner as previously described hereinabove with reference to FIGS. 4–7.

FIG. 9 is to the same effect as FIG. 8, except that cylindrical member 53 of shaft 33 contains no threads but rather is press-fit into cavity 54 of part 50. Pin 42 is again desirably inserted through part 50 and at least partially into member 53 at some point of the press-fit mating of member 53 with part 50.

What is claimed is:

1. In a flying gaff comprising a hook having an elongated shaft and a handle to detachably engage the lower portion of said shaft and including means to restrict rotational movement of the shaft relative to the handle, the improvement which comprises: a wing member mounted on said shaft in a manner such that it is freely rotatable around said shaft and including means to restrict axial movement of the wing member relative to the shaft, said wing member having an aperture at its lower extremity adapted to receive a retrieving line.

2. The flying gaff of claim 1 wherein the wing member is non-detachably mounted on the outer surface of an outer sleeve which is mounted on said shaft in a manner such that it is freely rotatable around the shaft, and including means to restrict axial movement of the outer sleeve relative to the shaft.

3. The flying gaff of claim 2 wherein the outer sleeve is rotatably mounted around the outer surface of an inner sleeve containing an upper and lower collar nondetachably affixed to the upper and lower extremity of the inner sleeve, said inner sleeve being mounted on said shaft such that the shaft is inserted through the upper collar, the inner sleeve and the lower collar and extending below the lower collar, said shaft being affixed to the inner sleeve, said upper and lower collars comprising the means to restrict the axial movement of the outer sleeve relative to the shaft.

4. The flying gaff of claim 3 wherein the base of the lower collar contains a tang affixed thereto normal to the circumferential axis of the lower collar, the handle comprises a tubular member containing a channel adapted to detachably engage said tang.

5. The flying gaff of claim 4 wherein the tubular member contains a cylindrical member the lower portion of which is inserted into the tubular member so as to create a water-tight fit with the tubular member, said cylindrical member containing an aperture to permit detachable insertion of the lower portion of the shaft thereinto and also containing a shoulder to restrict the degree of insertion into said tubular member, said shoulder containing said channel adapted to detachably engage said tang.

6. The flying gaff of claim 2 wherein the outer sleeve is rotatably mounted around the outer surface of an inner shoulder mounted on said shaft, said outer sleeve containing a well with a plurality of ball bearings interposed between the base of said well and a first side of said inner shoulder, said inner shoulder comprising a combination of (a) a plurality of split collar rings adapted to be circumferentially mounted about an annular recess circumferentially arranged on said shaft, said split collar rings having a bossed annular portion and an annular shelf portion recessed radially with respect to said bossed portion; and (b) a collar ring adapted to frictionally encompass the shelf portion of the split collar rings when the split collar rings are mounted on said annular recess, said means to restrict axial movement of the outer sleeve relative to the shaft comprising a circumferentially-disposed groove axially spaced in said well from said ball bearings and adapted to receive a retaining ring, said retaining ring being disposed in said groove rearward of a second side of said inner shoulder.

7. The flying gaff of claim 6 wherein said shaft contains a protuberance disposed on the outer surface of said shaft rearward of said retaining ring and the handle comprises a tubular member containing an internal channel adapted to detachably engage said protuberance.

8. The flying gaff of claim 2 in which the outer sleeve contains a well with a plurality of ball bearings interposed between the base of said well and a first side of an inner shoulder permanently affixed to said shaft, said shaft comprising two parts: (a) a first part terminating at its first end in a gaffing hook and terminating at its second end in an externally threaded cylindrical member and (b) a second part terminating in an inner shoulder permanently affixed thereto at its first end and also containing an internally threaded cylindrical cavity at said first end adapted to mate with said external threads, said means to restrict axial movement of the outer sleeve relative to the shaft comprising a circumferentially-disposed groove axially spaced in the well from said ball bearings and adapted to receive a retaining ring, said retaining ring being disposed in said groove rearward of a second side of said inner shoulder.

9. The flying gaff of claim 8 wherein said shaft contains a pin, said pin being inserted rearward of said retaining ring, through a first end of said second portion and at least partially into a first end of said cylindrical member, with at least a portion of said pin extending above the outer surface of the shaft and the handle comprises a tubular member having an internal channel adapted to detachably engage said portion of the pin extending above the outer surface of the shaft.

10. The flying gaff of claim 2 in which the outer sleeve contains a well with a plurality of ball bearings interposed between the base of said well and a first side of an inner shoulder permanently affixed to said shaft, said shaft comprising two parts: (a) a first part terminating at its first end in a gaffing hook and terminating at its second end in a cylindrical member and (b) a second part terminating in an inner shoulder permanently affixed thereto at its first end and also containing a cylindrical cavity adapted to frictionally mate with said cylindrical member, said means to restrict axial movement of the outer sleeve relative to the shaft comprising a circumferentially-disposed groove axially spaced in the well from said ball bearings and adapted to receive a retaining ring, said retaining ring being disposed in said groove rearward of a second side of said inner shoulder.

* * * * *